B. J. WILLIAMS.
Washing-Machine.

No. 8,861. Reissued Aug. 19, 1879.

Witnesses:
W Burris
H. A. Daniels.

Inventor:
Benjamin J. Williams
By Gilbert B. Fowler
Atty.

N. PETERS, PHOTO-LITHOGRAPHER, WASHINGTON, D. C.

UNITED STATES PATENT OFFICE.

BENJAMIN J. WILLIAMS, OF PHILADELPHIA, PENNSYLVANIA.

IMPROVEMENT IN WASHING-MACHINES.

Specification forming part of Letters Patent No. 216,925, dated June 24, 1879; Reissue No. 8,861, dated August 19, 1879; application filed July 19, 1879.

*To all whom it may concern:*

Be it known that I, BENJAMIN J. WILLIAMS, of Philadelphia, in the county of Philadelphia and State of Pennsylvania, have invented certain new and useful Improvements in Wash-Boilers and Washers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to wash-boilers and machines for washing clothes; and consists in a novel combination of parts and improvements in the construction of the same, as hereinafter stated.

The lower part of the boiler is provided with a hot-air chamber, with tubes communicating with the interior of the boiler, the heat about the tubes being thus brought to a great extent in contact with the water.

A receptacle for clothes, having a casing of wire-cloth or perforated sheet metal, is placed within the boiler, to be rotated therein, having arms with bearings in the boiler-casing. This rotating receptacle has ribs fixed along its inner surfaces, with strips of rubber or other suitable material mounted thereon, forming beaters for the clothes.

In connection with the rotating receptacle, which is cylindrical, a number of balls, preferably of rubber, are used, the said balls being placed loosely in the cylinder, to assist by their motion to spread out the clothes and prevent them from packing during the operation. The boiler has a detachable pedestal, which may be secured to the bottom, and thus adapt it to be placed on a small furnace when desired.

Figure 1:
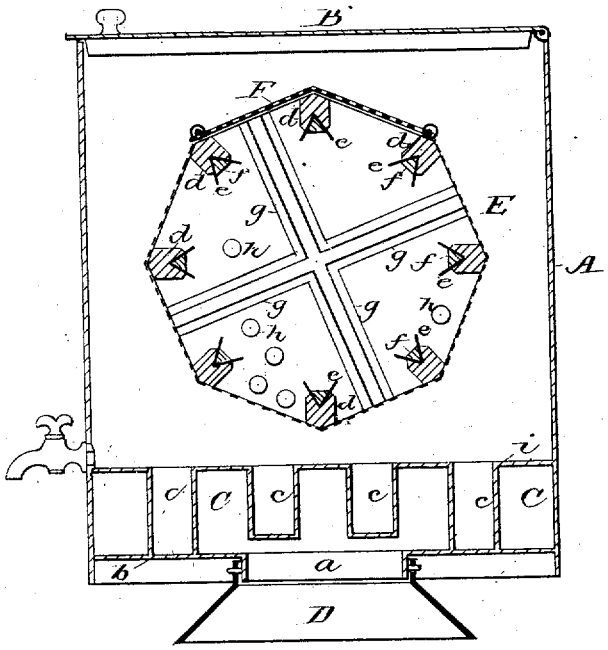
Figure 3:
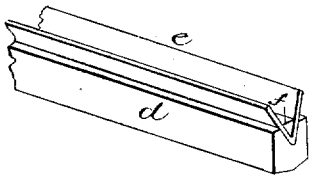
Figure 2:
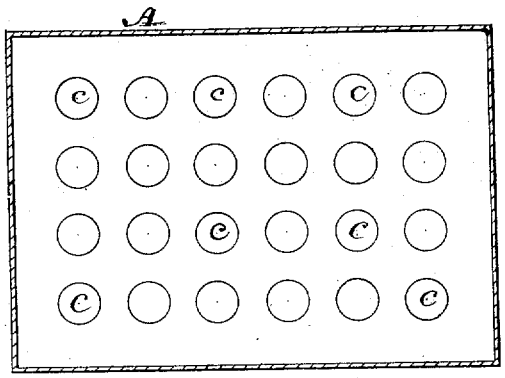

Figure 1 represents a transverse vertical section of my improved boiler and washer. Fig. 2 is a horizontal section of the boiler, showing a plan of the inside. Fig. 3 is a detached view of part of one of the ribs which are placed within the revolving clothes-receptacle.

Referring to the drawings, A designates the casing of the boiler, with hinged cover B. The hot-air chamber C at the bottom has within it the tubes *c*, communicating with the interior of the boiler, so that the water is more readily heated. In the bottom plate, *b*, is an opening, *a*, around which is a fixed collar for the purpose of attaching the pedestal D, which is detachably connected, and is made flaring, so that it will cover and conduct the heat from a small furnace, it being sometimes desired to use the boiler on such furnaces.

Within the boiler is placed a drum or cylindrical receptacle, E, for the clothes, having arms with bearings in the boiler-casing, so that it may be rotated, the cylinder or casing being usually of perforated sheet metal or wire-cloth. A portion of the cylinder is occupied by the hinged cover F, which has a proper fastening.

Along the cylinder, and against the inner surface thereof, is fixed a number of ribs, *d*, the same being grooved lengthwise to receive the strips *e*, of rubber or other suitable material, said strips being placed in the grooves so that the edges will project, forming flanges, as shown in the drawings, and being secured in place by the strips *f*, between which and the ribs *d* the rubber is secured. The ends or heads of the drum also have ribs *g*, made and provided in manner like the ribs of the cylinder. These ribs thus mounted form beaters for the clothes to keep them in motion during the operation of washing.

A number of balls, *h*, are used in connection with the drum, said balls being thrown in with the clothes. The balls, moving about as the drum revolves, increase the agitation and prevent the clothes from packing together.

As a modification in constructing the boiler, the tubes *c* may be made closed at the top and open at the lower end, so that the water closes around them, and the heat is admitted within them, thus avoiding the use of the upper plate, *i*.

I claim—

1. The wash-boiler A, having in its bottom plate, *b*, a central opening, *a*, and provided with a chamber, C, and tubes *c*, substantially as and for the purpose set forth.

2. The rotating cylinder F, provided on its inner surface with the ribs *d g*, having V-shaped grooves in their inner edges, which receive the projecting rubber wings *e*, said wings being held in place by the retaining-strips *f*, substantially as and for the purpose set forth.

3. The wash-boiler having the chamber C, the central opening, *a*, of which is provided with a collar to receive a detachable pedestal, D, for conducting the heat into the chamber C, substantially as described.

In testimony that I claim the foregoing I have hereunto set my hand.

BENJ. J. WILLIAMS.

Witnesses:

GEO. W. ZIMERMAN,

JOHN CLARK.